United States Patent
Lehmann et al.

(10) Patent No.: US 7,144,451 B2
(45) Date of Patent: Dec. 5, 2006

(54) METHOD OF PRINTING SHEET-FORM SUBSTRATES BY THE INKJET PRINTING PROCESS

(75) Inventors: Urs Lehmann, Basel (CH); Roger Lacroix, Villiage-Neuf (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 179 days.

(21) Appl. No.: 10/399,878

(22) PCT Filed: Dec. 12, 2001

(86) PCT No.: PCT/EP01/14603

§ 371 (c)(1), (2), (4) Date: Apr. 23, 2003

(87) PCT Pub. No.: WO02/50196

PCT Pub. Date: Jun. 27, 2002

(65) Prior Publication Data
US 2004/0032474 A1 Feb. 19, 2004

(30) Foreign Application Priority Data
Dec. 21, 2000 (EP) .................... 00811224

(51) Int. Cl.
*C09D 11/02* (2006.01)
*B41J 2/01* (2006.01)

(52) U.S. Cl. .................... 106/31.48; 347/100
(58) Field of Classification Search ............ 106/31.48; 534/797; 347/100
See application file for complete search history.

(56) References Cited

U.S. PATENT DOCUMENTS

| | | | |
|---|---|---|---|
| 4,605,442 A | 8/1986 | Kawashita et al. | 106/31.48 |
| 4,997,919 A | 3/1991 | Schaulin | 534/637 |
| 5,374,301 A | 12/1994 | Gregory et al. | 106/31.48 |
| 5,728,201 A * | 3/1998 | Saito et al. | 106/31.48 |
| 6,015,455 A * | 1/2000 | Yano et al. | 106/31.58 |
| 6,342,096 B1 * | 1/2002 | Kurabayashi | 106/31.27 |
| 6,511,535 B1 * | 1/2003 | Lacroix et al. | 106/31.44 |
| 6,767,394 B1 * | 7/2004 | Shawcross et al. | 106/31.48 |
| 6,863,719 B1 * | 3/2005 | Butler et al. | 106/31.28 |
| 6,867,286 B1 * | 3/2005 | Holloway et al. | 534/797 |
| 2004/0123773 A1 * | 7/2004 | Butler et al. | 106/31.28 |

FOREIGN PATENT DOCUMENTS

| EP | 0168961 | 1/1986 |
|---|---|---|
| EP | 0348344 | 12/1989 |

OTHER PUBLICATIONS

Patent Abstract of Japan Publication No. 57102972, Jun. 1982.

* cited by examiner

*Primary Examiner*—Helene Klemanski
(74) *Attorney, Agent, or Firm*—Joseph Suhadolnik

(57) ABSTRACT

The invention relates to a method of printing sheet-form substrates by the inkjet printing process, which method comprises printing those materials with an aqueous ink comprising a) at least one dye of formula

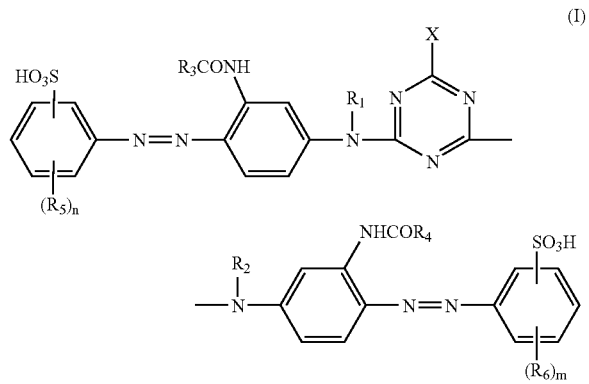

(I)

wherein
$R_1$ and $R_2$ are each independently of the other hydrogen or unsubstituted or substituted $C_1$–$C_4$alkyl,
$R_3$ and $R_4$ are each independently of the other unsubstituted or substituted $C_1$–$C_4$alkyl,
$R_5$ and $R_6$ are each independently of the other $C_1$–$C_4$alkyl, $C_1$–$C_4$alkoxy, halogen, hydroxy, carboxy, $C_2$–$C_4$alkanoylamino or sulfo,
X is halogen, hyrodroxy, $C_1$–$C_4$alkoxy that is unsubstituted or substituted in the alkyl moiety, phenoxy that is unsubstituted or substituted in the phenyl ring, $C_1$–$C_4$alkylthio that is unsubstituted or substituted in the alkyl moiety, phenylthio that is unsubstituted or substituted in the phenyl ring, amino, N-mono-, or N, N-di-$C_1$–$C_6$alkylamino that is unsubstituted or substituted in the alkyl moiety and uninterrupted or interrupted in the alkyl moiety by oxygen,
$C_5$–$C_7$cycloaklylamino that is unsubstituted or substituted in the cycloalkyl ring, phenyl- or naphthyl-amino that is unsubstituted or substituted in the aryl moiety, N—$C_1$–$C_4$alkyl-N-phenyl- or N—$C_1$–$C_4$alkyl-N-naphthyl-amino that is unsubstituted or substituted in the aryl moiety, benzylamino that is unsubstituted or substituted in the phenyl moiety, morpholino or piperidin-1-yl, and
n and m are each independently of the other the number 0, 1, 2 or 3; and
b) a solubilizer or a humectant.

12 Claims, No Drawings

METHOD OF PRINTING SHEET-FORM SUBSTRATES BY THE INKJET PRINTING PROCESS

This application is a of PCT/EP01/14603 filed Dec. 12, 2001.

The present invention relates to a method of printing sheet-form substrates, for example paper, plastics films or textile fibre materials, by the inkjet printing process, and to the inks used in the method.

High demands are made nowadays of ink compositions for inkjet applications, especially for use in multicolour or photographic printing. For example, it is of considerable importance that the dyes on which the inks are based should correspond as closely as possible to the three primary colours yellow, cyan and magenta. The choice of suitable dyes is limited not only by the purity of colour and the desired brilliance of the colour reproduction, but also by the required shade. Although a large number of yellow acid dyes and direct dyes are known, only a few of them are suitable, for the reasons mentioned, for use in inkjet printing. In order to adjust the ink with respect to the required shade, known yellow inkjet inks often comprise mixtures of different types of yellow dye, for example mixtures of golden-yellow direct dyes with a lemon-yellow dye. Such lemon-yellow dyes have the disadvantage, however, that they have a tendency to catalytic fading in the green colour region when used in combination with cyan, and this has a markedly adverse effect in yellow inkjet inks comprising such lemon-yellow dyes.

Dyes suitable for inkjet applications should also yield prints having good fastness to light, good wet fastness properties and high tinctorial strength, and they should exhibit good solubility in the solvent on which the ink is based. The inks should also be storage-stable and produce no precipitate on prolonged storage and, when used in inkjet printers, they should ensure high operating reliability of the printer.

For that reason there is a continued need for an inkjet printing process in which improved yellow ink compositions are used and which does not have the above-mentioned disadvantages or has them to only a negligible degree.

Accordingly, the present invention relates to a method of printing sheet-form substrates by the inkjet printing process, which method comprises printing those materials with an aqueous ink comprising
a) at least one dye of formula

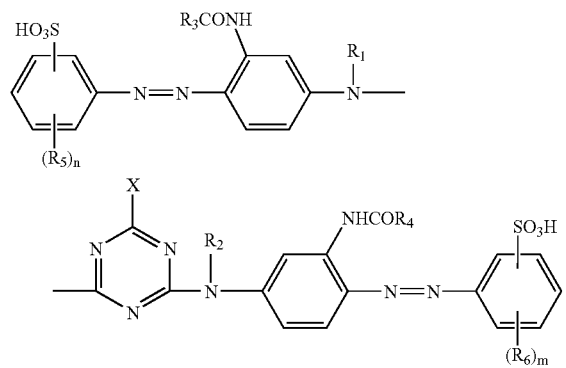

(1)

wherein
$R_1$ and $R_2$ are each independently of the other hydrogen or unsubstituted or substituted $C_1$–$C_4$alkyl,
$R_3$ and $R_4$ are each independently of the other unsubstituted or substituted $C_1$–$C_4$alkyl,
$R_5$ and $R_6$ are each independently of the other $C_1$–$C_4$alkyl, $C_1$–$C_4$alkoxy, halogen, hydroxy, carboxy, $C_2$–$C_4$alkanoylamino or sulfo,
X is halogen, hydroxy, $C_1$–$C_4$alkoxy that is unsubstituted or substituted in the alkyl moiety, phenoxy that is unsubstituted or substituted in the phenyl ring, $C_1$–$C_4$alkylthio that is unsubstituted or substituted in the alkyl moiety, phenylthio that is unsubstituted or substituted in the phenyl ring, amino, N-mono- or N,N-di-$C_1$–$C_6$alkylamino that is unsubstituted or substituted in the alkyl moiety and uninterrupted or interrupted in the alkyl moiety by oxygen,
$C_5$–$C_7$cycloalkylamino that is unsubstituted or substituted in the cycloalkyl ring, phenyl- or naphthyl-amino that is unsubstituted or substituted in the aryl moiety, N—$C_1$–$C_4$alkyl-N-phenyl- or N—$C_1$–$C_4$alkyl-N-naphthyl-amino that is unsubstituted or substituted in the aryl moiety, benzylamino that is unsubstituted or substituted in the phenyl moiety, morpholino or piperidin-1-yl, and
n and m are each independently of the other the number 0, 1, 2 or 3; and
b) a solubiliser or a humectant.

The dyes of formula (1) are present either in the form of their free acid or, preferably, in the form of their salts. There come into consideration as salts, for example, the alkali metal, alkaline earth metal or ammonium salts or the salts of an organic amine. Examples which may be mentioned include the sodium, lithium, potassium or ammonium salts or the salt of mono-, di- or tri-ethanolamine. Preference is given to the sodium and lithium salts and to the mixed salts of sodium and lithium.

There come into consideration as $C_1$–$C_4$alkyl for $R_1$, $R_2$, $R_3$, $R_4$, $R_5$ and $R_6$, each independently of the others, for example, methyl, ethyl, n-propyl, isopropyl, n-butyl, sec-butyl, tert-butyl or isobutyl, preferably methyl or ethyl and especially methyl. The mentioned alkyl radicals $R_1$ and $R_2$ may be unsubstituted or substituted, for example, by hydroxy, sulfo, sulfato, cyano or by carboxy. The mentioned alkyl radicals $R_3$ and $R_4$ may be unsubstituted or substituted, for example, by hydroxy, cyano or by carboxy, preferably by hydroxy. The corresponding unsubstituted alkyl radicals are preferred for $R_1$, $R_2$, $R_3$ and $R_4$.

There come into consideration as $C_1$–$C_4$alkoxy for $R_5$ and $R_6$, each independently of the other, for example, methoxy, ethoxy, n-propoxy, isopropoxy, n-butoxy, sec-butoxy, tert-butoxy or isobutoxy, preferably methoxy or ethoxy and especially methoxy.

There come into consideration as halogen for $R_5$ and $R_6$, each independently of the other, for example, fluorine, chlorine or bromine, preferably chlorine or bromine and especially chlorine.

There come into consideration as $C_2$–$C_4$alkanoylamino for $R_5$ and $R_6$, each independently of the other, for example, acetylamino or propionylamino, especially acetylamino.

There come into consideration as halogen for X, for example, fluorine, chlorine or bromine, preferably fluorine or chlorine and especially chlorine.

X as $C_1$–$C_4$alkoxy is, for example, methoxy, ethoxy, n-propoxy, isopropoxy, n-butoxy, sec-butoxy, isobutoxy or tert-butoxy, especially methoxy or ethoxy. The mentioned radicals are unsubstituted or substituted in the alkyl moiety, for example by $C_1$–$C_4$alkoxy, for example methoxy or ethoxy; hydroxy; sulfo or by carboxy.

X as $C_1$–$C_4$alkylthio is, for example, methylthio, ethylthio, n-propylthio, isopropylthio or n-butylthio. The mentioned radicals are unsubstituted or substituted in the alkyl moiety, for example by $C_1$–$C_4$alkoxy, for example methoxy or ethoxy; hydroxy; sulfo or by carboxy. Preference is given to the radicals substituted in the alkyl moiety by one or two radicals from the group hydroxy, sulfo and carboxy, especially hydroxy and carboxy.

X as phenoxy or phenylthio can include both unsubstituted radicals and radicals substituted in the phenyl ring, for example by $C_1$–$C_4$alkyl, for example methyl or ethyl, which in turn may be substituted, for example by carboxy; $C_1$–$C_4$alkoxy, for example methoxy or ethoxy; carboxy; carbamoyl; N—$C_1$–$C_4$alkylcarbamoyl, which in turn may be substituted in the alkyl moiety, for example by carboxy, for example N-carboxymethylcarbamoyl; sulfo or by halogen, for example chlorine or bromine.

X as N-mono- or N,N-di-$C_1$–$C_6$alkylamino, preferably N-mono- or N,N-di-$C_1$–$C_4$alkylamino, is, for example, N-methylamino, N-ethylamino, N-propylamino, N-butylamino, N-hexylamino, N,N-dimethylamino or N,N-diethylamino. The mentioned radicals are unsubstituted or substituted in the alkyl moiety, for example by $C_2$–$C_4$alkanoylamino, for example acetylamino or propionylamino; hydroxy; sulfo; sulfato; carboxy; carbamoyl; sulfamoyl or by β-sulfato-ethylsulfonyl. The mentioned radicals are uninterrupted or interrupted in the alkyl moiety by oxygen. The following may be mentioned as examples of radicals that are substituted in the alkyl moiety and uninterrupted or interrupted in the alkyl moiety by oxygen: N-βhydroxy-ethylamino, N,N-di-β-hydroxyethylamino, N-2-(β-hydroxyethoxy)-ethylamino, N-2-[2-(β-hydroxyethoxy)ethoxy]ethylamino, N-β-sulfatoethylamino, N-β-sulfoethylamino, N-carboxymethylamino, N-β-carboxyethylamino, N-α,β-dicarboxyethylamino, N-α,γ-dicarboxypropylamino, N-ethyl-N-β-hydroxyethylamino and N-methyl-N-β-hydroxyethylamino. Preference is given to radicals that are substituted in the alkyl moiety by hydroxy, sulfo, sulfato, carboxy or by carbamoyl and uninterrupted or interrupted in the alkyl moiety by oxygen.

X as $C_5$–$C_7$cycloalkylamino can include both unsubstituted radicals and radicals substituted in the cycloalkyl ring, for example by $C_1$–$C_4$alkyl, for example methyl or ethyl, especially methyl, or by carboxy. The corresponding cyclohexyl radicals are preferred as such radicals.

X as phenylamino or N—$C_1$–$C_4$alkyl-N-phenylamino, preferably phenylamino, can include both unsubstituted radicals and radicals substituted in the phenyl ring, for example by $C_1$–$C_4$alkyl, for example methyl or ethyl, which in turn may be substituted, for example by carboxy; $C_1$–$C_4$alkoxy, for example methoxy or ethoxy; carboxy; carbamoyl; N—$C_1$–$C_4$alkylcarbamoyl, which in turn may be substituted in the alkyl moiety, for example by carboxy, for example N-carboxymethylcarbamoyl; sulfo or by halogen, for example chlorine or bromine. Preference is given to substituted radicals, especially radicals substituted by carboxy, carboxymethyl, N-carboxymethylcarbamoyl or sulfo, especially by sulfo.

X as naphthylamino or N—$C_1$–$C_4$alkyl-N-naphthylamino, preferably naphthylamino, can include both unsubstituted radicals and radicals substituted in the naphthyl ring, for example by sulfo. Preference is given to radicals substituted by from 1 to 3 sulfo groups, especially 2 or 3 sulfo groups.

X as benzylamino that is unsubstituted or substituted in the phenyl moiety can include both unsubstituted radicals and radicals substituted in the phenyl ring, for example by $C_1$–$C_4$alkyl, for example methyl or ethyl; $C_1$–$C_4$alkoxy, for example methoxy or ethoxy; carboxy; sulfo or by halogen, for example chlorine or bromine. Preference is given to radicals substituted in the phenyl ring by carboxy.

$R_1$ and $R_2$ are preferably hydrogen.

$R_3$ and $R_4$ are each independently of the other preferably methyl, ethyl, hydroxymethyl or β-hydroxyethyl, more preferably methyl or ethyl and especially methyl.

$R_5$ and $R_6$ are each independently of the other preferably $C_1$–$C_4$alkyl, $C_1$–$C_4$alkoxy, halogen, hydroxy, $C_2$–$C_4$alkanoylamino or sulfo, especially methyl, ethyl, methoxy, ethoxy, chlorine or sulfo and very especially methyl.

X is preferably halogen; $C_1$–$C_4$alkoxy that is unsubstituted or substituted in the alkyl moiety by $C_1$–$C_4$alkoxy, hydroxy, sulfo or by carboxy; $C_1$–$C_4$alkylthio that is unsubstituted or substituted in the alkyl moiety by $C_1$–$C_4$alkoxy, hydroxy, sulfo or by carboxy; amino; N-mono- or N,N-di-$C_1$–$C_4$alkylamino that is unsubstituted or substituted in the alkyl moiety by $C_2$–$C_4$alkanoylamino, hydroxy, sulfo, sulfato, carboxy, carbamoyl or by sulfamoyl and that is uninterrupted or interrupted in the alkyl moiety by oxygen; $C_5$–$C_7$cycloalkylamino that is unsubstituted or substituted by $C_1$–$C_4$alkyl or by carboxy; phenylamino or N—$C_1$–$C_4$alkyl-N-phenylamino that is unsubstituted or substituted in the phenyl moiety by $C_1$–$C_4$alkyl (which in turn may be substituted by carboxy), $C_1$–$C_4$alkoxy, carboxy, carbamoyl, N—$C_1$–$C_4$alkylcarbamoyl (which in turn may be substituted in the alkyl moiety by carboxy), sulfo or by halogen; naphthylamino that is unsubstituted or substituted in the aryl moiety by sulfo; or benzylamino that is unsubstituted or substituted in the phenyl moiety by $C_1$–$C_4$alkyl, $C_1$–$C_4$alkoxy, carboxy, sulfo or by halogen; morpholino or piperidin-1-yl.

X is especially halogen; $C_1$–$C_4$alkylthio that is unsubstituted or substituted in the alkyl moiety by hydroxy, sulfo or by carboxy, especially by hydroxy or carboxy; amino; N-mono- or N,N-di-$C_1$–$C_4$alkylamino that is unsubstituted or substituted in the alkyl moiety by $C_2$–$C_4$alkanoylamino, hydroxy, sulfo, sulfato, carboxy or by carbamoyl, especially by hydroxy, sulfo or by carboxy, and that is uninterrupted or interrupted in the alkyl moiety by oxygen; or morpholino.

X is very especially halogen; N-mono- or N,N-di-$C_1$–$C_4$alkylamino that is unsubstituted or substituted in the alkyl moiety by hydroxy, sulfo or by carboxy; or morpholino; and most especially morpholino.

n and m are each independently of the other preferably the number 0, 1 or 2, especially 0 or 1.

In a preferred embodiment of the present invention there is used a dye of formula (1) wherein $R_1$ and $R_2$ are hydrogen, $R_3$ and $R_4$ are each independently of the other methyl, ethyl, hydroxymethyl or β-hydroxy-ethyl, $R_5$ and $R_6$ are each independently of the other methyl, ethyl, methoxy, ethoxy, chlorine or sulfo, X is N-mono- or N,N-di-$C_1$–$C_4$alkylamino that is unsubstituted or substituted in the alkyl moiety by hydroxy, sulfo or by carboxy, or is morpholino, and n is the number 0 or 1.

In an especially preferred embodiment of the present invention, the dye of formula (1) corresponds to a dye of formula

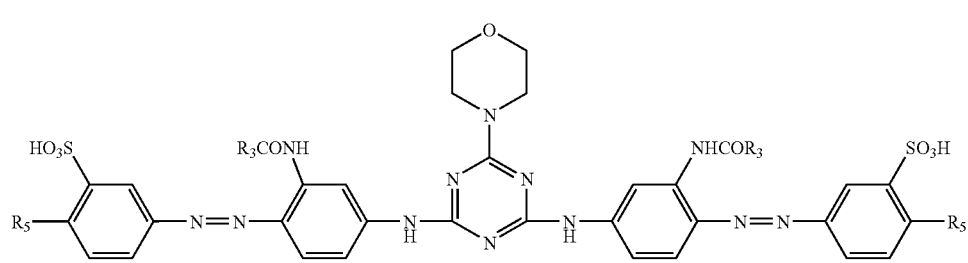

(1a)

wherein $R_3$ is methyl or ethyl, preferably methyl, and $R_5$ is hydrogen or methyl, preferably hydrogen.

The dyes of formulae (1) and (1a) contained in the inks used according to the invention are preferably symmetrical with respect to the monoazo radicals, that is to say, for example in the dye of formula (1a), the radicals $R_3$ are identical and the radicals $R_5$ have identical meanings.

The dyes of formula (1) are known or can be obtained analogously to known preparation processes, such as diazotisation, coupling and condensation reactions.

Dyes of formula (1) and their preparation are described, for example, in U.S. Pat. No. 4,997,919.

The present invention relates also to the aqueous inks used in the inkjet printing method according to the invention, which inks comprise a) at least one dye of formula (1), preferably of formula (1a), wherein $R_1$, $R_2$, $R_3$, $R_4$, $R_5$, $R_6$, X, n and m each have the definitions and preferred meanings mentioned above, and b) a solubiliser or a humectant.

The dyes contained in the inks should preferably have a low salt content, that is to say should have a total inorganic salt content of less than 0.5% by weight, based on the weight of the dyes. Dyes which, as a result of their preparation and/or the subsequent addition of diluents, have higher salt contents can be desalted, for example, by membrane separation processes, such as ultrafiltration, reverse osmosis or dialysis.

The inks preferably have a total dye content of from 0.5 to 35% by weight, especially from 1 to 30% by weight and preferably from 1 to 20% by weight, based on the total weight of the ink. The preferred lower limit is 1.2% by weight, especially 1.5% by weight. The upper limit is preferably 15% by weight, especially 10% by weight.

The inks comprise a solubiliser or a humectant, for example water-miscible organic solvents, for example $C_1$–$C_4$alcohols, such as methanol, ethanol, n-propanol, isopropanol, n-butanol, sec-butanol, tert-butanol or isobutanol; amides, for example dimethylformamide or dimethylacetamide; ketones or ketone alcohols, for example acetone, methyl isobutyl ketone, diacetone alcohol; ethers, for example tetrahydrofuran or dioxane; nitrogen-containing heterocyclic compounds, for example N-methyl-2-pyrrolidone or 1,3-dimethyl-2-imidazolidone; polyalkylene glycols, preferably low molecular weight polyethylene glycols having a molecular weight of from 100 to 800, for example diethylene glycol, triethylene glycol, tetraethylene glycol, polyethylene glycol 200, polyethylene glycol 300, polyethylene glycol 400 or polyethylene glycol 600, especially those having a molecular weight of from 150 to 400, or low molecular weight polypropylene glycols, for example dipropylene glycol, tripropylene glycol, polypropylene glycol P 400 or polypropylene glycol P 425; $C_1$–$C_4$alkyl ethers of polyalkylene glycols, for example diethylene glycol monobutyl ether, 2-(2-methoxyethoxy)-ethanol, 2-(2-ethoxyethoxy)-ethanol, 2-[2-(2-methoxyethoxy)ethoxy]-ethanol or 2-[2(2-ethoxyethoxy)ethoxy]ethanol; $C_2$–$C_6$alkylene glycols and thioglycols, for example ethylene glycol, propylene glycol, butylene glycol, 1,5-pentanediol, thiodiglycol, hexylene glycol; other polyols, for example glycerol or 1,2,6-hexanetriol; and $C_1$–$C_4$alkyl ethers of polyhydric alcohols, for example 2-methoxyethanol or 1-methoxypropan-2-ol.

The inks preferably comprise at least one solubiliser or one humectant from the group polyethylene glycols having a molecular weight of from 150 to 400, diethylene glycol monobutyl ether, N-methyl-2-pyrrolidone and glycerol and, especially, tetraethylene glycol, polyethylene glycol 400, diethylene glycol monobutyl ether and glycerol, usually in an amount of from 2 to 30% by weight, especially from 5 to 25% by weight and preferably from 20 to 25% by weight, based on the total weight of the ink.

The inks may also comprise solubilisers, for example ε-caprolactam.

There come into consideration as humectants in the inks according to the invention, for example, also urea or a mixture of sodium lactate (advantageously in the form of a 50 to 60% aqueous solution) and glycerol and/or propylene glycol in amounts of preferably from 0.1 to 30% by weight, especially from 2 to 30% by weight.

The inks may comprise thickening agents of natural or synthetic origin, inter alia for the purpose of adjusting the viscosity.

Examples of thickening agents which may be mentioned are commercially available alginate thickeners, starch ethers or locust bean gum ethers, especially sodium alginate on its own or in admixture with a modified cellulose, for example methyl-, ethyl-, carboxymethyl-, hydroxyethyl-, methylhydroxyethyl-, hydroxypropyl- or hydroxypropylmethyl-cellulose, especially with preferably from 20 to 25% by weight carboxymethylcellulose. There may be mentioned as synthetic thickening agents also, for example, those based on poly(meth)acrylic acids or poly(meth)acrylamides.

The inks comprise such thickening agents, for example, in an amount of from 0.01 to 2% by weight, especially from 0.01 to 1% by weight and preferably from 0.01 to 0.5% by weight, based on the total weight of the ink.

The inks may also comprise buffer substances, for example borax, borates, phosphates, polyphosphates or citrates. Examples which may be mentioned include borax, sodium borate, sodium tetraborate, sodium dihydrogen phosphate, disodium hydrogen phosphate, sodium tripolyphosphate, sodium pentapolyphosphate, as well as sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

The inks may comprise surfactants or wetting agents as further additives.

There come into consideration as surfactants or wetting agents commercially available anionic or non-ionic surfactants.

The inks may also comprise conventional additives, for example antifoam agents or, especially, substances inhibiting fungal and/or bacterial growth. Such substances are usually used in amounts of from 0.01 to 1% by weight, based on the total weight of the ink.

As preservatives there come into consideration agents yielding formaldehyde, for example paraformaldehyde and trioxane, especially aqueous, approximately from 30 to 40% by weight, formaldehyde solutions, imidazole compounds, for example 2-(4-thiazolyl)benz-imidazole, thiazole compounds, for example 1,2-benzisothiazolin-3-one or 2-n-octylisothiazolin-3-one, iodine compounds, nitrites, phenols, haloalkylthio compounds or pyridine derivatives, especially 1,2-benzisothiazolin-3-one or 2-n-octyl-isothiazolin-3-one.

The inks can be prepared in a conventional manner by mixing the individual constituents, for example in the desired amount of water. Suspended substances and insoluble constituents contained in the inks are removed, for example, by filtration through filters having a pore size of from 0.2 to 0.5 μm.

Preference is given to inks having a viscosity of from 1 to 40 mPa·s, especially from 1 to 20 mPa·s and preferably from 1 to 10 mPa·s.

The inks according to the invention are suitable for use in recording systems in which the ink is expressed in the form of droplets from a small aperture and is directed towards a sheet-form substrate on which an image is produced. Suitable substrates are, for example, paper, plastics films or textile fibre materials, preferably paper or plastics films and especially paper. Suitable recording systems are, for example, commercially available inkjet printers for use in the printing of paper or textiles.

There may be mentioned as examples of paper that can be printed with the inks according to the invention commercially available inkjet paper, photo paper, glossy paper, plastics-coated paper, for example Epson inkjet paper, Epson photo paper, Epson glossy paper, Epson glossy film, HP special inkjet paper, Encad photo gloss paper, Ilford photo paper. Plastics films that can be printed with the inks according to the invention are, for example, transparent or milky/opaque. Suitable plastics films are, for example, 3M transparency film. Glossy paper, for example Epson glossy paper, is preferred.

There come into consideration as textile fibre materials especially nitrogen-containing or hydroxy-group-containing fibre materials, for example textile fabric of cellulose, silk, wool or synthetic polyamides, especially silk.

In inkjet printing, individual droplets of the ink are sprayed onto a substrate in a controlled manner from a nozzle. For this purpose, predominantly the continuous inkjet method and the drop-on-demand method are used. In the continuous inkjet method, the droplets are produced continuously and any droplets not required for the printing are conveyed to a collecting vessel and recycled, whereas in the drop-on-demand method droplets are produced and printed as required; that is to say, droplets are produced only when required for the printing. The production of the droplets can be effected, for example, by means of a piezo-inkjet head or by means of thermal energy (bubble jet). For the method according to the invention, printing by means of a piezo-inkjet head is preferred. Also preferred for the method according to the invention is printing in accordance with the continuous inkjet method.

The inks according to the invention are suitable especially as the yellow component for multicolour or photographic printing and yield a neutral photographic yellow. It is possible largely to dispense with mixtures of different types of yellow dyes, since the required, ideal shade is already established when individual dyes of formula (1) are used.

The dyes of formula (1) contained in the inks according to the invention have the further advantage that their preparation does not use toxic chemicals such as phosgene or p-cresidine, which are necessary for the production of commercially available inkjet yellow dyes, for example C.I. Direct Yellow 132 and C.I. Direct Yellow 86.

The prints produced according to th invention exhibit good fastness to light and good water fastness properties. They are distinguished especially by high brilliance of colour and high tinctorial strength and are free of catalytic fading in the green colour region when used in combination with cyan. The inks according to the invention are storage-stable and produce no precipitate on prolonged storage.

The Examples which follow serve to illustrate the invention. Temperatures are given in degrees Celsius, parts are parts by weight, and percentages relate to percentages by weight, unless indicated to the contrary. Parts by weight bear the same relationship to parts by volume as kilograms to litres.

The following inks A to D are prepared by dissolving the dye and the other solid components in a mixture of water and the water-miscible organic solvent(s) indicated in each case in the mentioned amounts, and then filtering the solution:

Ink A:

1.67 parts of a dye of formula

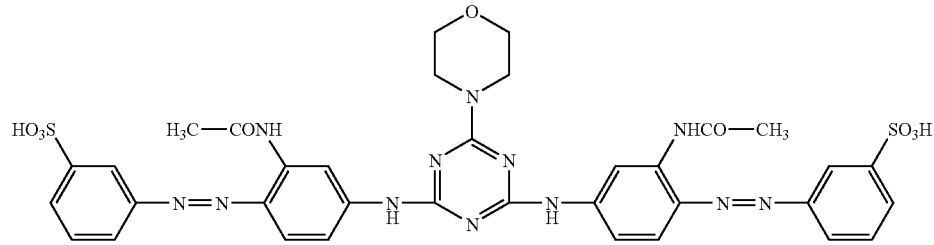

(101)

which has been rendered largely free of inorganic salts, in the form of the sodium salt
20.0 parts of polyethylene glycol 400
5.0 parts of diethylene glycol monobutyl ether
0.3 part of Proxel GXL (commercially available preservative)
0.1 part of Forafac 1110 D (commercially available wetting agent)
72.93 parts of water Ink B:
1.67 parts of a dye of formula (101), which has been rendered largely free of inorganic salts, in the form of the sodium salt
20.0 parts of glycerol
0.3 part of Proxel GXL (commercially available preservative)
0.1 part of Forafac 1110 D (commercially available wetting agent)
77.93 parts of water Ink C:
1.67 parts of a dye of formula (101), which has been rendered largely free of inorganic salts, in the form of the sodium salt
20.0 parts of tetraethylene glycol
5.0 parts of diethylene glycol monobutyl ether
0.3 part of Proxel GXL (commercially available preservative)
0.1 part of Forafac 1110 D (commercially available wetting agent)
72.93 parts of water Ink D:
1.67 parts of a dye of formula (101), which has been rendered largely free of inorganic salts, in the form of the sodium salt
25.0 parts of tetraethylene glycol
0.3 part of Proxel GXL (commercially available preservative)
0.1 part of Forafac 1110 D (commercially available wetting agent)
72.93 parts of water The inks A, B, C and D so obtained are each used for printing a commercially available inkjet paper, photo paper or a glossy film (e.g. Epson glossy film) by means of a drop-on-demand inkjet printer. The prints exhibit a high brilliance of colour and high tinctorial strength and are free of catalytic fading in the green colour region when used in combination with cyan. Prints having a high brilliance of colour and high tinctorial strength, which are free of catalytic fading in the green colour region when used in combination with cyan, are also obtained when there is used, instead of the dye of formula (101) in the form of the sodium salt, the same amount of a dye of formula (101), which has been rendered largely free of inorganic salts, in the form of the lithium salt.

If the procedure described above is followed, but there is used in each of inks A, B, C and D, instead of 1.67 parts of a dye of formula (101), the same amount of a dye, which has been rendered largely free of inorganic salts, of the general formula

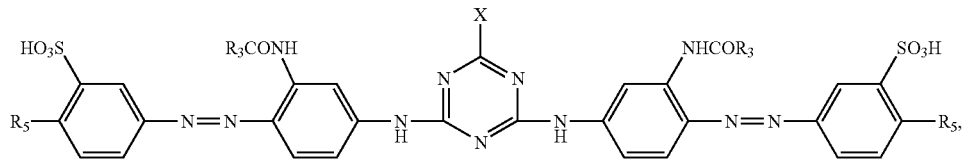

wherein $R_3$, $R_5$ and X are each as defined in Table 1, in the form of both the sodium salt and the lithium salt, there are likewise obtained prints that exhibit a high brilliance of colour and high tinctorial strength and that are free of catalytic fading in the green colour region when used in combination with cyan.

TABLE 1

| Dye of formula | $R_3$ | $R_5$ | X |
|---|---|---|---|
| (102) | —$CH_3$ | —$CH_3$ | —N(morpholino)O |
| (103) | —$CH_2CH_3$ | —H | —N(morpholino)O |
| (104) | —$CH_2CH_3$ | —$CH_3$ | —N(morpholino)O |

TABLE 1-continued

| Dye of formula | R₃ | R₅ | X |
|---|---|---|---|
| (105) | —CH₃ | —H | —N(CH₂CH₂—OH)₂ |
| (106) | —CH₃ | —CH₃ | —N(CH₂CH₂—OH)₂ |
| (107) | —CH₃ | —CH₃ | —NH—CH₂—COOH |
| (108) | —CH₂—OH | —CH₃ | —N(CH₂CH₂—OH)₂ |
| (109) | —CH₂—OH | —CH₃ | —N(morpholine) |
| (110) | —CH₂—OH | —CH₃ | —NH—CH₂CH₂—OH |
| (111) | —CH₂—OH | —H | —NH—CH₂CH₂—OH |
| (112) | —CH₂CH₃ | —H | —N(CH₂CH₂—OH)₂ |
| (113) | —CH₃ | —H | —Cl |
| (114) | —CH₃ | —CH₃ | —NH—CH₂—CH₂—O—CH₂—CH₂—OH |
| (115) | —CH₃ | —H | —N(CH₂—CH₂—OH)(CH₂—CH₃) |
| (116) | —CH₃ | —H | —NH—CH₂—CH₂—OSO₃H |
| (117) | —CH₃ | —H | —NH—CH₂—CH₂—SO₃H |
| (118) | —CH₃ | —H | —N(CH₃)—CH₂—CH₂—SO₃H |
| (119) | —CH₃ | —H | —NH—CH₂—CH₂—COOH |
| (120) | —CH₃ | —H | —NH—CH₂—CH₂—CH₂—COOH |
| (121) | —CH₃ | —H | —N(CH₂—COOH)₂ |
| (122) | —CH₃ | —H | —NH—CH(COOH)—CH₂—COOH |
| (123) | —CH₃ | —H | —NH—C₆H₃(COOH)₂ (3,5-) |
| (124) | —CH₃ | —CH₃ | —NH₂ |
| (125) | —CH₃ | —CH₃ | —N(CH₃)₂ |
| (126) | —CH₃ | —CH₃ | —NH—CH₂—CH₃ |
| (127) | —CH₃ | —H | —NH—C₆H₄—COOH (2-) |
| (128) | —CH₃ | —H | —NH—C₆H₃(COOH)₂ (2,4-) |
| (129) | —CH₃ | —H | —NH—C₆H₄—SO₃H (2-) |
| (130) | —CH₃ | —H | —NH—C₆H₄—SO₃H (4-) |

TABLE 1-continued

| Dye of formula | $R_3$ | $R_5$ | X |
|---|---|---|---|
| (131) | —$CH_3$ | —$CH_3$ | —NH—(phenyl with $HO_3S$ and $SO_3H$) |
| (132) | —$CH_3$ | —H | —NH—(phenyl)—$CH_2$—COOH |
| (133) | —$CH_3$ | —H | —NH—(phenyl)—CONH—$CH_2$—COOH |
| (134) | —$CH_3$ | —H | —NH—$CH_2$—(phenyl)—COOH |
| (135) | —$CH_3$ | —H | —NH—(naphthyl with $SO_3H$, $HO_3S$, $SO_3H$) |
| (136) | —$CH_3$ | —H | —S—$CH_2$—$CH_2$—COOH |
| (137) | —$CH_3$ | —H | —S—$CH_2$—COOH |
| (138) | —$CH_3$ | —H | —S—$CH_2$—$CH_2$—OH |
| (139) | —$CH_3$ | —H | —S—$CH_2$—$CH_2$—$CH_2$—$SO_3H$ |

If the procedure described above is followed, but there is used in each of inks A, B, C and D, instead of 1.67 parts of a dye of formula (101), the same amount of a dye, which has been rendered largely free of inorganic salts, of formula

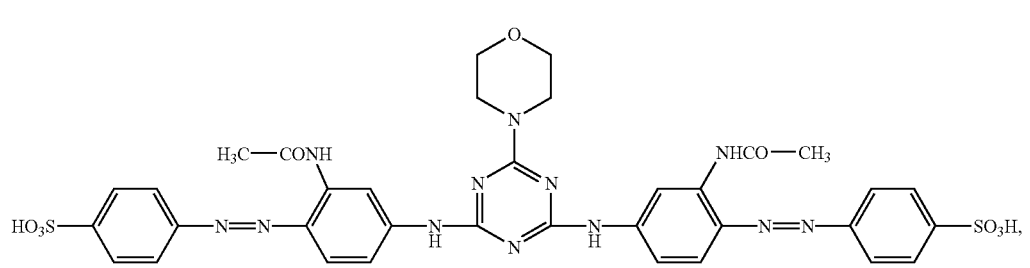

(140)

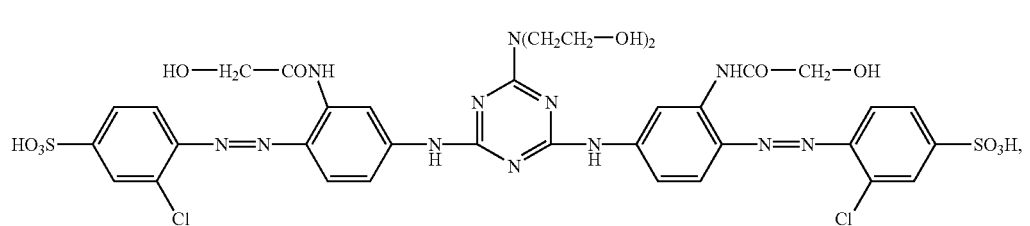

(141)

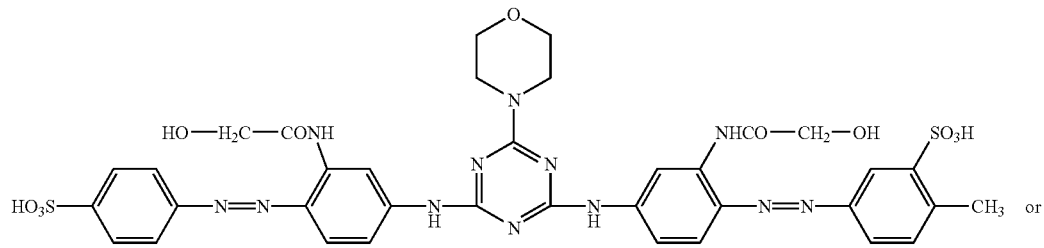

(142)

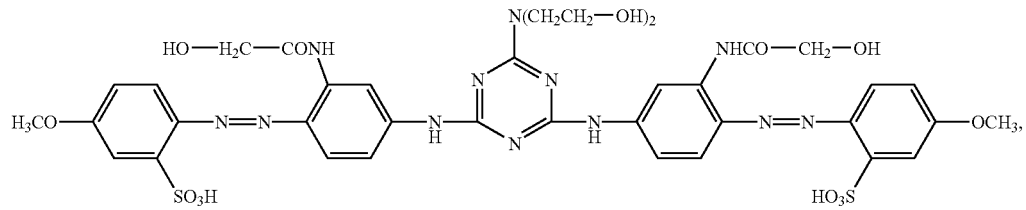

(143)

in each case in the form of the sodium salt and the lithium salt, there are likewise obtained prints that exhibit a high brilliance of colour and high tinctorial strength and that are free of catalytic fading in the green colour region when used in combination with cyan.

What is claimed is:

1. A method of printing sheet-form substrates by the inkjet printing process, which method comprises printing those materials with an aqueous ink comprising
   a) at least one dye of formula

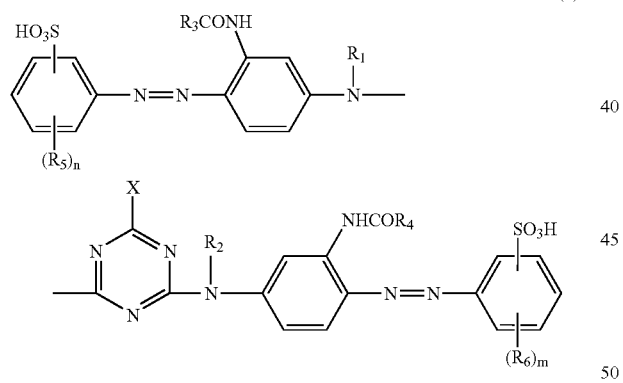

(1)

wherein
   $R_1$ and $R_2$ are each independently of the other hydrogen or unsubstituted or substituted $C_1$–$C_4$alkyl,
   $R_3$ and $R_4$ are each independently of the other unsubstituted or substituted $C_1$–$C_4$alkyl,
   $R_5$ and $R_6$ are each independently of the other $C_1$–$C_4$alkyl, $C_1$–$C_4$alkoxy, halogen, hydroxy, $C_2$–$C_4$alkanoylamino or sulfo,
   X is halogen, hydroxy, $C_1$–$C_4$alkoxy that is unsubstituted or substituted in the alkyl moiety, phenoxy that is unsubstituted or substituted in the phenyl ring, $C_1$–$C_4$alkylthio that is unsubstituted or substituted in the alkyl moiety, phenylthio that is unsubstituted or substituted in the phenyl ring, amino, N-mono- or N,N-di-$C_1$–$C_6$alkylamino that is unsubstituted or substituted in the alkyl moiety and uninterrupted or interrupted in the alkyl moiety by oxygen, $C_5$–$C_7$cycloalkylamino that is unsubstituted or substituted in the cycloalkyl ring, phenyl- or naphthyl-amino that is unsubstituted or substituted in the aryl moiety, N—$C_1$–$C_4$alkyl-N-phenyl- or N—$C_1$–$C_4$alkyl-N-naphthyl-amino that is unsubstituted or substituted in the aryl moiety, benzylamino that is unsubstituted or substituted in the phenyl moiety, morpholino or piperidin-1-yl, and
   n and m are each independently of the other the number 1, 2 or 3; and
   b) a solubiliser or a humectant selected from the group consisting of polyethylene glycols having a molecular weight of from 150 to 400.

2. A method according to claim 1, wherein
   $R_1$ and $R_2$ are hydrogen.

3. A method according to claim 1, wherein
   $R_3$ and $R_4$ are each independently of the other methyl, ethyl, hydroxymethyl or β-hydroxyethyl.

4. A method according to claim 1, wherein
   $R_5$ and $R_6$ are each independently of the other methyl, ethyl, methoxy, ethoxy, chlorine or sulfo.

5. A method according to claim 1, wherein
   X is halogen; $C_1$–$C_4$alkoxy that is unsubstituted or substituted in the alkyl moiety by $C_1$–$C_4$alkoxy, hydroxy, sulfo or by carboxy; $C_1$–$C_4$alkylthio that is unsubstituted or substituted in the alkyl moiety by $C_1$–$C_4$alkoxy, hydroxy, sulfo or by carboxy; amino; N-mono- or N,N-di-$C_1$–$C_4$alkylamino that is unsubstituted or substituted in the alkyl moiety by $C_2$–$C_4$alkanoylamino, hydroxy, sulfo, sulfato, carboxy, carbamoyl or by sulfamoyl and that is uninterrupted or interrupted in the alkyl moiety by oxygen; $C_5$–$C_7$cycloalkylamino that is unsubstituted or substituted by $C_1$–$C_4$alkyl or by carboxy; phenylamino or N—$C_1$–$C_4$alkyl-N-phenylamino that is unsubstituted or substituted in the phenyl moiety by $C_1$–$C_4$alkyl which in turn may be substituted by carboxy, $C_1$–$C_4$alkoxy, carboxy, carbamoyl, N—$C_1$–$C_4$alkylcarbamoyl which in turn may be substituted in the alkyl moiety by carboxy, sulfo or by halogen; naphthylamino that is unsubstituted or substituted in the aryl moiety by sulfo; benzylamino that is unsubstituted or substituted in the phenyl moiety by $C_1$–$C_4$alkyl, $C_1$–$C_4$alkoxy, carboxy, sulfo or by halogen; morpholino or piperidin-1-yl.

6. A method according to claim 1, wherein

X is halogen; $C_1$–$C_4$alkylthio that is unsubstituted or substituted in the alkyl moiety by hydroxy, sulfo or by carboxy; amino; N-mono- or N,N-di-$C_1$–$C_4$alkylamino that is unsubstituted or substituted in the alkyl moiety by $C_2$–$C_4$alkanoylamino, hydroxy, sulfo, sulfato, carboxy or by carbamoyl and that is uninterrupted or interrupted in the alkyl moiety by oxygen; or is morpholino.

7. A method according to 1, wherein

X is N-mono- or N,N-di-$C_1$–$C_4$alkylamino that is unsubstituted or substituted in the alkyl moiety by hydroxy, sulfo or by carboxy; or is morpholino.

8. A method according to claim 1, wherein n and m are each independently of the other the number 0 or 1.

9. A method according to claim 1, wherein $R_1$ and $R_2$ are hydrogen, $R_3$ and $R_4$ are each independently of the other methyl, ethyl, hydroxymethyl or β-hydroxyethyl, $R_5$ and $R_6$ are each independently of the other methyl, ethyl, methoxy, ethoxy, chlorine or sulfo, X is N-mono- or N,N-di-$C_1$–$C_4$alkylamino that is unsubstituted or substituted in the alkyl moiety by hydroxy, sulfo or by carboxy; or is morpholino, and n is the number 0 or 1.

10. A method according to claim 1, wherein the dye of formula (1) is a dye of formula

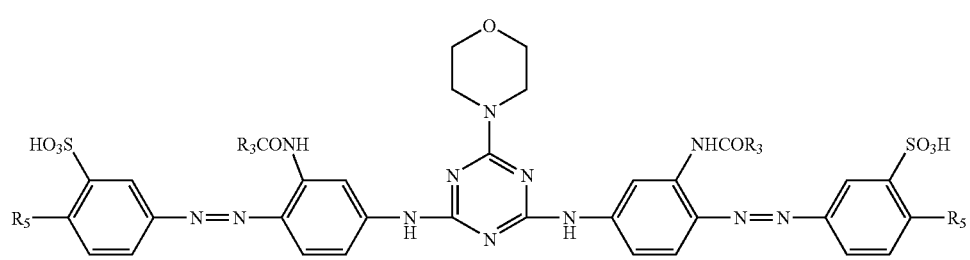
(1a)

wherein $R_3$ is methyl or ethyl, and $R_5$ is hydrogen or methyl.

11. A method according to claim 1, wherein the sheet-form substrate is paper or a plastics film.

12. An aqueous ink for the inkjet printing process, which ink comprises a) at least one dye of formula

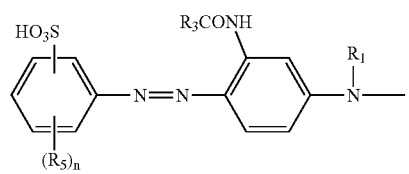
(1)

-continued

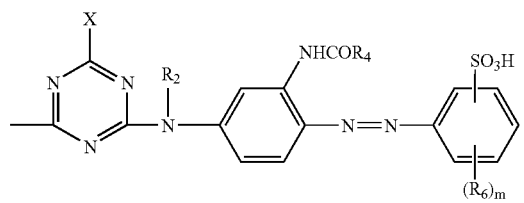

wherein $R_1$ and $R_2$ are each independently of the other hydrogen or unsubstituted or substituted $C_1$–$C_4$alkyl, $R_3$ and $R_4$ are each independently of the other unsubstituted or substituted $C_1$–$C_4$alkyl, $R_5$ and $R_6$ are each independently of the other $C_1$–$C_4$alkyl, $C_1$–$C_4$alkoxy, halogen, hydroxy, carboxy, $C_2$–$C_4$alkanoylamino or sulfo, X is halogen, hydroxy, $C_1$–$C_4$alkoxy that is unsubstituted or substituted in the alkyl moiety, phenoxy that is unsubstituted or substituted in the phenyl ring, $C_1$–$C_4$alkylthio that is unsubstituted or substituted in the alkyl moiety, phenylthio that is unsubstituted or substituted in the phenyl ring, amino, N-mono- or N,N-di-$C_1$–$C_6$alkylamino that is unsubstituted or substituted in the alkyl moiety and uninterrupted or interrupted in the alkyl moiety by oxygen, $C_5$–$C_7$cycloalkylamino that is unsubstituted or substituted in the cycloalkyl ring, phenyl- or naphthyl-amino that is unsubstituted or substituted in the aryl moiety, N—$C_1$–$C_4$alkyl-N-phenyl- or N—$C_1$–$C_4$alkyl-N-naphthyl-amino that is unsubstituted or substituted in the aryl moiety, benzylamino that is unsubstituted or substituted in the phenyl moiety, morpholino or piperidin-1-yl, and n and m are each independently of the other the number 1, 2 or 3; and b) a solubiliser or a humectant selected from the group consisting of polythylene glycols having a molecular weight of from 150 to 400.